Jan. 19, 1937.  D. L. McNEAL  2,068,345
ELECTROPNEUMATIC BRAKE EQUIPMENT
Filed Oct. 19, 1935  2 Sheets-Sheet 2

INVENTOR
DONALD L. McNEAL
BY Wm. H. Cady
ATTORNEY

Patented Jan. 19, 1937

2,068,345

UNITED STATES PATENT OFFICE 2,068,345

ELECTROPNEUMATIC BRAKE EQUIPMENT

Donald L. McNeal, Wilkinsburg, Pa., assignor to The Westinghouse Air Brake Company, Wilmerding, Pa., a corporation of Pennsylvania Application October 19, 1935, Serial No. 45,698

22 Claims. (Cl. 303—15)

This invention relates to brake equipment and more particularly to brake equipment for high speed railway trains and traction vehicles.

Modern conditions require that railway trains and traction vehicles be operated at relatively high speeds. When such trains and vehicles are operated at high speed a braking equipment must be provided which combines a high degree of reliability with flexibility so that the train or vehicle can be handled with the utmost regard for safety. This invention relates to train braking systems adapted for use on high speed trains such for example as equipment of the general character disclosed and claimed in the copending application of Ellis E. Hewitt, for Brake equipment, Serial No. 741,063, filed August 22, 1934, and assigned to the same assignee as this application.

In the braking equipment disclosed in the copending application above referred to a master relay device is employed having an electric relay portion and a pneumatic relay valve portion. The electric relay portion is controlled by the differential pressures between the control pipe and the straight air pipe, acting on opposite sides of a diaphragm for actuating switch contact members which control circuits for energizing an application magnet valve device, and a release magnet valve device, to control the application and release of the brakes. The pneumatic relay valve portion parallels pneumatically the functions of the electric relay portion and its associated application and release magnet valve devices, in case the electric circuits should fail or be interrupted intentionally by directly controlling the flow of air to and from the straight air pipe in response to the supply of fluid under pressure to, or the release of fluid under pressure from, the control pipe. The relay valve portion is so constructed that a slightly greater differential of pressure between the control pipe and the straight air pipe is required to cause its operation than is required to cause the operation of the electric relay portion.

The present invention combines the pneumatic and electric portions of the master relay device above referred to into a structure in which the pneumatic valve portion and the electric switch portion are operated from a single element subject to the differential pressures between the straight air pipe and the control pipe.

An object of the invention is the provision of a master relay device of the character described comprising a compact unitary relay structure for electrically controlling the application and release of the brakes in accordance with control pipe pressure and for pneumatically controlling the application and release of the brakes in case of failure of the electric circuits that normally control the brake system.

Another object of the invention is the provision of an electropneumatic relay valve device having large capacity and operative upon a low differential in pressure across the piston for controlling the supply of fluid under pressure to, and the release of fluid under pressure from, the brake cylinder of the fluid pressure brake equipment.

Other objects and advantages of the invention will appear in part from the following description of several preferred embodiments of the invention when read together with the accompanying drawings, in which.

Figures 1, 2:
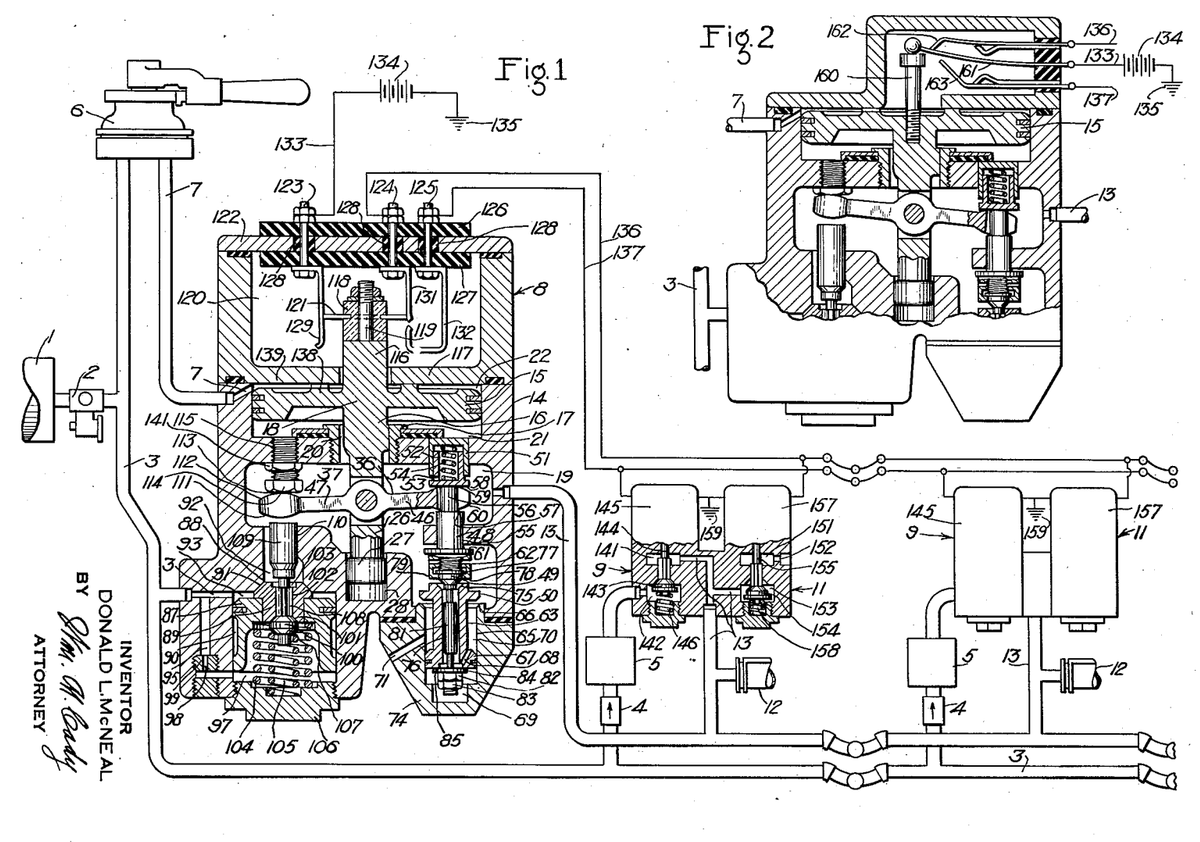
Fig. 1 is a diagrammatic view of a brake equipment employing one preferred embodiment of the relay valve device, shown in section.
Figs. 2, 3, and 4 are sectional views showing other preferred embodiments of the relay valve device.

Referring to the drawings and more particularly to Fig. 1 thereof, a brake system is illustrated comprising a main reservoir 1 through which fluid under pressure is supplied, at a reduced pressure, by the feed valve device 2 to a main reservoir pipe 3, and through check valves 4 to the auxiliary reservoirs 5 of each braking unit. A brake valve device 6 is employed for controlling the supply of fluid under pressure from the main reservoir pipe 3 through the control pipe 7 to the master relay device 8 that comprises an electrical portion and a pneumatic portion, the electrical portion controlling an application magnet valve device 9 and a release magnet valve device 11 that control the supply of fluid under pressure from the auxiliary reservoir 5 to the brake cylinder 12, and the release of fluid under pressure from the brake cylinder to the atmosphere, and a pneumatic portion for controlling the supply of fluid under pressure to the brake cylinder 12 from the main reservoir pipe 3 through the straight air pipe 13.

The master relay device 8 comprises a casing 14 in which is operatively mounted a control piston 15 slidably mounted within a cylindrical portion of the casing 14 and connected to a baffle piston 16 which is of less diameter than the control piston 15 and which is adapted to be reciprocated in a tubular bushing 17 secured to the casing, said pistons being integrally connected by a stem 18.

The piston 16 and the bushing 17 are so formed as to provide an always open restricted communication 20 between a pressure chamber 19 within the casing 14 which is connected to the brake cylinder 12 through the straight air pipe 13, and a piston chamber 21 at the rear face of the piston 15.

The piston chamber 22 at the front side of the control piston 15 is connected to the control pipe 7, through which fluid under pressure is adapted to be supplied to and released from the piston chamber by operation of the brake valve device 6.

Extending inwardly from the baffle piston 16 and preferably integral therewith is a piston stem 26 having a circular end portion 27 which is slidably guided within a bore 28 in the wall of the casing 14. The piston stem 26 is provided intermediate the baffle piston 16 and the guide portion 27 with a rockable lever 36 carried by a bolt or bearing pin 37.

The lever 36 is contained in the pressure chamber 19 and is provided with oppositely disposed arms 46 and 47 which are adapted to control the operation of a release valve mechanism and a supply valve mechanism respectively.

The release valve mechanism comprises a plunger 48, the pilot release valve 49 and a main release valve 50. The plunger 48 is slidably guided at one end in a bushing 51 mounted in the casing. This end of the plunger is provided with a central bore 52 which is open to the chamber 19 through a passage 53 for the purpose of preventing dashpot action when the plunger is moved. Contained in the bore is a spring 54 which operatively engages the plunger and bushing and which, as will hereinafter be more fully explained, exerts a light counterbalancing pressure on the piston assembly. The plunger, adjacent its other end, is slidably guided within a bore 55 in the casing. Intermediate the bushing 51 and the bore 55 the plunger is reduced in diameter as indicated by the reference character 56 to form spaced shoulders 57 and 58 which are adapted to be operatively engaged by oppositely disposed convex surfaces 59 and 60, respectively, on the end portion of the arm 46 of the controlling lever 36, said end portion of the lever being forced to accommodate the portion 56 of the plunger. The plunger is provided with a collar 61 which is located inwardly of the bore 55 and beyond the collar is provided a screw-threaded portion 62.

The main release valve 50 is provided with a stem 63 which is in axial alignment with the plunger 48 and is positioned within a bore 65, provided at one end with a valve seat 66 for the release valve 50. The valve stem is integrally connected to a piston 67 which is slidably mounted in the bore 65, and this piston is provided with a small port 68 which constantly connects the chamber 69 at one side of the piston to a chamber 70 at the opposite side thereof, which is constantly connected with the atmosphere through a passage 71 in the cap 74 of the casing. The main release valve 50 is provided with a valve seat 75 on which, as will hereinafter be more fully explained, the pilot release valve 49 is adapted to seat, and is provided with an axial bore 76 which extends from the valve seat 75 through the valve stem 63 to the outer face of the piston 67.

The pilot release valve 49 is in axial alignment with the plunger 48 and with the main release valve 50, and is provided with a circular head 77. The head portion is attached in abutting relation to the screw-threaded end portion 62 of the plunger by means of a hooded nut 79.

The pilot valve 49 is provided with a stem 81 which passes longitudinally through the bore 76 in the main release valve and which at its end is provided with a stop nut 82 and a locking nut 83 for locking the stop nut against accidental turning. The stop nut is tightened down in close engagement with the circular collar 84 which is preferably integral with the valve stem 81 and is so arranged as to insure an open communication between the piston chamber 69 and the bore 76 in the main release valve stem 63 when the collar 84 is in engagement with the underside of the piston 67.

It will be understood from the foregoing description of the release valve assembly that when the pilot release valve 49 is unseated, as shown in Fig. 1, there will be an open communication from the piston chamber 69 to the pressure chamber 19 through the bore 76 in the valve stem 63.

In the manufacture of the relay valve device a plunger 48, pilot release valve 49, and the main release valve 50 are secured together as a unit preparatory to being mounted in engagement. In assembling these parts the plunger 48 and the pilot release valve 49 are first connected together by means of a nut 79, then the main release valve is mounted upon the stem 81 of the pilot release valve, and finally the stop nuts 82 and 83 are turned to the position in which they are shown in Fig. 1. In turning the nut 82 down tight on the collar 84, the nut 79 is adapted to be engaged by the jaws of a wrench to prevent the plunger from being turned, the stem 81 being held from turning by the engagement of the nut with the square portion 78 of the stem.

The supply valve mechanism may comprise a valve piston which in the present embodiment of the invention consists of a piston 87 and a main supply valve 88 having an annular sleeve 89 which has a pressed fit with the piston within an opening provided in the piston. The piston is slidably guided in a bore 90 in the casing 14. At the inner end of this bore a valve seat 91 is provided which surrounds a passageway 92, leading from a chamber 93 at one side of the valve piston to the pressure chamber 19, the chamber 93 being constantly in open communication with the main reservoir passage and pipe 3. The main supply valve 88 is movable into or out of seating engagement with the valve seat 91 and is therefore adapted to control communication through the passageway 92.

At the side of the valve piston 87 opposite the chamber 93, there is provided a chamber 97 which is connected to the chamber 95 through a passage 98 of small diameter provided in a choke plug 99 having screw-threaded connection with the casing.

Contained in the chamber 97 is a pilot supply valve 100 which is adapted to move into and out of engagement with a seat 101 provided on the end of the valve sleeve 89 to control communication through a central bore 102 in the sleeve, which bore leads from the valve seat to a narrow slot 103 provided in the face of the main supply valve 88, said slot being in constant open communication with the pressure chamber 19.

Also contained in the chamber 97 are control coil springs 104 and 105 which at all times urge the supply valve 88 and the pilot supply valve 100, respectively, toward their seats. The spring 104 is interposed between, and operatively engages the piston 87 and a cap nut 106 which closes an opening in the casing 14 through which the pilot supply valve 100 and springs 104 and 105 are adapted to be inserted or removed from the casing. The spring 105 is encircled by the spring 104 and is interposed between and operatively engages the cap nut 106 and a spring seat 107 integral with this pilot supply valve.

The pilot supply valve 100 is provided with a fluted stem 108 which is slidably guided in the supply valve. When the pilot valve is seated the stem 108 extends across the slot 103 and projects a short distance beyond the face of the main supply valve and is adapted to be operatively engaged by one end of a valve controlling plunger 109 which is axially aligned with the valve piston and pilot supply valve and which is slidably guided in a bore 110 in the casing. The lower end of the plunger has a diameter which is greater than the width of the slot 103 so that it will operatively engage the face of the main supply valve after the pilot supply valve has been moved a limited distance from its seat.

The other end of the plunger 109 operatively engages a convex surface 111 provided on one end of the arm 47 of the control lever 36. The opposite side of the arm 47 is provided with a convex surface 112 which is adapted to engage the convex face 113 of a fulcrum member 114 screw-threadedly attached within a bore 115 in the casing structure. The fulcrum member is adjustable relative to the casing 14 to compensate for unavoidable inaccuracies in manufacture and for wear on the various parts of the apparatus.

In Fig. 1 of the drawings the relay valve device is shown more or less diagrammatically in order to simplify the construction thereof. The construction of the portion of the apparatus below the main piston 15 as illustrated in Fig. 1 may however correspond exactly with that illustrated and described in the copending application of Ellis E. Hewitt for fluid pressure valve device, Serial No. 740,202, filed August 17, 1934, and assigned to the same assignee as this application.

The electric portion of the relay device 8 comprises a stem 116 extending upwardly from the main piston 15 through an opening in the wall 17 which stem carries at its upper end an insulating portion 118 which may be attached to the stem 116 by a bolt 119 and carries a switch contact member 121. An end plate 122 provides a cover for the switch chamber 120 in which switch connecting studs 123, 124, and 125 are mounted and insulated from the plate 122 by plates 126 and 127 of insulating material and insulating tubular members 128 positioned about the studs 123, 124 and 125. Switch contact members 129, 131, and 132 are attached to the studs 123, 124, and 125, respectively, and extend inwardly into the switch chamber 120 in such positions that the switch member 121 may bridge the switch members 129 and 131, or 129 and 132, depending upon the position of the piston 15 and the piston stem 116. The stud 123 is connected by a wire 133 to one terminal of a source of supply indicated by the battery 134 one terminal of which is grounded at a point 135. The stud 124 is connected to a release magnet valve wire 136 extending throughout the length of the train and the stud 125 is connected to an application magnet valve wire 137, extending throughout the length of the train.

The application magnet valve device 9 comprises a casing containing a chamber 141 that is in constant open communication with the brake cylinder 12 through passage and pipe 13, and an application valve chamber 142 that is in constant open communication with the supply reservoir 5, and that contains an application valve 143, having a stem 144 that is operatively connected to a magnet 145. The application valve chamber 142 contains a spring 146 for urging the valve 143 upwardly to its seat.

The release magnet valve device 11 comprises a casing containing a release chamber 151 that is in constant communication with the atmosphere through an exhaust port 152, and a release valve chamber 153 that is in constant communication with the brake cylinder 12 through passage and pipe 13, and which contains a release valve 154 that is operatively connected by means of a stem 155 to a magnet 156 in the upper part of the casing. A spring 160 is provided within the release valve chamber 153 for urging the valve 154 to its seat.

In assembling the several parts of the relay valve device 8 the adjustable fulcrum member 114 is screwed into the bore 115 a sufficient distance that it cannot interfere with the proper seating of the main and pilot supply valves 88 and 100 respectively. After the supply valves 88 and 100 are properly seated and the annular stop rib 138 of the piston 15 is in contact with the cover plate 139 of the casing 14 the adjustable fulcrum member 114 is turned to a position such that when the curved surface 112 of the arm 47 is in engagement with the fulcrum member 114 a space will be provided either between the arm 47 and the plunger 109, or between the plunger 109 and the valve stem 108. This space is for the purpose of permitting sufficient movement of the piston 15 from the position corresponding to electric lap in either direction to permit sufficient movement of the pistons to effect operation of the magnet valve devices prior to operation of the application and release valves in the pneumatic portion of the relay. When the desired clearance exists in the movement of the arm 47, either between the surface 111 and the plunger 109, or between the valve engaging end of the plunger 109 and the stem 108 of the pilot supply valve 100 the fulcrum member is no longer rotated and is secured in its proper position by turning the locking nut 141 tightly against the wall of the casing into which the fulcrum member 114 is screw-threaded.

When the lever 36 is being moved by the fulcrum member 114 the piston remains in its normal position so that the lever 36 rocks in a counterclockwise direction about the bolt 37 and, as a consequence, the plunger 48 and the connected release valve parts are moved in the direction toward the piston 15 against the opposing pressure of the spring 54.

*Charging the Equipment*

In charging the equipment, fluid under pressure from the main reservoir 1, as supplied by the feed valve 2, to the main reservoir pipe 3 at a reduced pressure flows through passage 3 into the chambers 93 and 95 of the relay valve device. Fluid under pressure flows from the chamber 95 through the restricted passage 98 in the plug 99 to the pilot supply valve chamber 97. The flow of fluid from the chamber 95 to the chamber 93 is at a faster rate than the flow of fluid to the chamber 97 by way of the restricted passage 98, but since, as will hereinafter more fully appear, the pressure of the spring 104 is sufficient to maintain the main supply valve 88 seated against full main reservoir pipe pressure in chamber 93 the communication between the chambers 93 and 19 will not be unintentionally established. The auxiliary or supply reservoirs 5 on each brake unit are charged by the flow of fluid under pressure through the check valves 4 to main reservoir pipe pressure.

With the brake valve device 6 in release position the piston chamber 22 of the relay valve device is vented in the usual way and the piston 15 together with the several parts associated therewith will be in the position in which they are shown in Fig. 1. In this position the chamber 19, and, consequently the brake cylinder 12, are in communication with the atmosphere by way of the straight air pipe 13, the pressure chamber 19, the unseated main release valve 50 to chamber 70 and passage 71.

Also with the piston chamber 22 of the relay valve device vented and the parts in the position illustrated in Fig. 1, a circuit is completed from the positive terminal of the battery 134, through wire 133, stud 123, the switch contact members 129, 121 and 131, the release magnet valve wire 136, the windings of the magnets 157 of the release magnet valve devices 11 to ground at 159, and to the grounded terminal 135 of the battery 134, thus energizing the magnets 157 of the release magnet valve devices 11, and forcing each release valve 152 downwardly from its seat to effect communication from the brake cylinder 12 to the atmosphere through the exhaust port 152.

Operation

When the equipment is thus charged, and it is desired to make an application of the brakes the operator will move the handle of the brake valve device 6 to supply fluid under pressure through the control pipe 7 to the piston chamber 22 of the relay valve device to effect the building up of a pressure therein corresponding to the desired degree of application of the brakes. Fluid under pressure, thus supplied to the piston chamber 22 causes the relay control piston 15 to move forwardly from the position illustrated in Fig. 1. It will be understood that when the piston 15 is in the position in which it is illustrated in Fig. 1 the spring 54 is slightly compressed and acts through the medium of the plunger 48, lever 36, piston stem 41, and the fulcrum member 114 to assist fluid pressure supplied to the piston chamber 22 in moving the piston 15 forwardly. This spring also acts to cushion the piston when it is moved from its forward position to its illustrated position. It will be noted that the piston 15 is provided with an annular stop rib 138 which projects outwardly from the face of the piston and which is adapted to engage the inner surface of a cover plate 117 forming the part of the casing 14 and closing the open end of the chamber 21.

As the connected pistons 15 and 16 are moved inwardly the piston stem 26 thereof carries the bolt 37 and the central portion of the lever 36 in the same direction and as the lever 36 is thus moved, the end of the arm 47 thereof fulcrums on the fulcrum member 114 until, as will be hereinafter more fully described, the pilot and main release valves 49 and 50, respectively, are seated.

Since the end of the arm 47 of the lever 36 is fulcrumed as above described the arm 46 is caused to move in the same direction as the pistons 15 and 16 and the stem 26, the lever rocking slightly about the bolt 37 in a clockwise direction in response to the force of the spring 54, and the end of the arm 47 rocking slightly on the fulcrum member 114. The arm 46, as it thus moves, forces the plunger 48 in the same direction as the piston 26 is moving and first causes the pilot release valve 49 to engage its seat 75, and then, through the medium of the pilot valve, causes the main release valve 50 to be moved into engagement with its seat 66. As the main release valve 50 is moved toward its seat the piston 67 which moves with the valve decreases the volume of the chamber 69 and fluid in this chamber, which would be otherwise compressed by the piston 67, is permitted to flow to the atmosphere through the passage 68 in the piston, chamber 70, and the exhaust port 71. It will be understood that the venting of the fluid from the chamber 69 instead of permitting it to be compressed, and thereby resist the closing movement of the main release valve 50 contributes to the sensitiveness of the relay valve device as a whole.

In this position of the pistons 15 and 17 and the stem 26 the pilot and main release valves 49 and 50 respectively and also the pilot and main supply valves 100 and 88 respectively are all in lap position. Upon a slight further inward movement of the pistons 15 and 16 the fixed contact member 121 is moved from engagement with the switch contact member 131 to interrupt the above traced circuit through the release magnet valve wire 136 and the magnets 157 of the release valve devices 11, thus deenergizing the magnets and permitting the release valves 154 to be forced upwardly to their seats by the spring 159, thus closing communication from the brake cylinder 12 to the atmosphere through the exhaust port 152. The application valve 143 and the release valve 154 that are controlled by the electrical portion of the relay valve device 8 are now also in lap position.

Upon a further inward movement of the pistons 15 and 17 from lap position the movable contact member 121 will be brought into engagement with the switch contact member 132 thus completing a circuit from the battery 134 through battery 134, through wire 133, stud 123, switch contact members 129, 121, and 132, the stud 125 and the application magnet valve wire 137, through the windings of the magnets 145 of the application magnet valve devices 9 to ground at 159 and to the grounded terminal 135 of the battery 134, thus energizing the application magnet valve devices and forcing the application valve 143 downwardly against the bias of the spring 146 to effect the supply of fluid under pressure from the supply reservoir 5 to the brake cylinder 12 through the passages and pipe 13. Fluid under pressure also flows from the straight air pipe 13 to the pressure chamber 19 of the relay valve device and past the piston 16 through the groove 20 to the chamber 21 until the pressure therein builds up to a value equal to, or slightly in excess of the pressure in the piston chamber 22 and forces the piston 15 to lap position to interrupt the circuit through the switch contact members 121 and 132, thus deenergizing the winding of the magnet 145 and permitting the application valve 143 of the magnet valve device 9 to be forced to its seat by the spring 146. It will be seen therefore that the ultimate pressure effected in the straight air pipe 13 and the brake cylinder 12, and in the chamber 21 of the brake valve device, will correspond substantially to the pressure within the piston chamber 22. The space provided between the curved surface 111 of the arm 47 and the end of the plunger 109 permits sufficient inward movement of the lever 36 and of the pistons 15 and 16, after the supply valves 49 and 50 have seated, to interrupt the circuit through the release magnet valve wire 136 and establish the circuit through the application magnet valve wire 137 prior to unseating the supply valves 100 and 88.

If the electric circuits and magnet valve devices operate as described, the pressure in the chamber 21 will build up at about the same rate as the pressure builds up in the piston chamber 22, so that only a small differential exists between the pressures on the opposite sides of the piston 15, which will not be sufficient to force the pilot valve 100 from its seat. If the circuit controlling the magnet valve devices 9 and 11 fail for any reason, the application of the brakes will be effected through the pneumatic portion of the relay valve device 8. When the main release valve 50 is seated the shoulder 57 on the plunger 48 acts as a stationary fulcrum for the arm 46 of the lever 36 so that as the pistons 15 and 16 and the stem 26 continue to move downwardly the arm 47 is caused to move in the same direction as the piston stem is moving, the lever 36 rocking slightly about the bolt 37 and the end of the arm 46 rocking slightly on the shoulder 57.

The arm 47 as it is thus moved forces the plunger 109 in the same direction as the piston stem 26 is moving and said plunger being in engagement with the fluted stem 108 of the pilot supply valve 100 causes the valve to be unseated against the opposing pressure of the spring 125. Fluid under pressure now flows from the chamber 97 to the pressure chamber 19 at a faster rate than fluid is supplied thereto through the restricted passage 98 in the plug 99. This results in a reduction in the pressure of fluid in the chamber 97, and, as a consequence, the pressure acting on the piston 87 to maintain the valve 88 seated is reduced.

After the pilot valve 100 has been unseated the plunger 109 engages the face of the valve 88 on each side of the slot 103. It will here be understood that the rate of reduction in the pressure of fluid in the chamber 97 by the flow of fluid to the pressure chamber 19 is such that at the time the plunger 109 operatively engages the face of the valve 88 the pressure of the springs 104 and 105 and fluid in the chamber 97 slightly exceeds the main reservoir pipe pressure in the chamber 93 acting on that portion of the valve piston which surrounds the valve 88. In view of this only a slight increase in the pressure of fluid in the piston chamber 22 over that required to unseat the valve 100 is necessary to cause the valve 88 to be unseated against the opposing reduced seating pressure. This partial unloading of the piston 87 contributes materially to the sensitiveness of the relay valve device as a whole. Fluid under pressure supplied from the main reservoir pipe to the chamber 93 now flows past the unseated supply valve 88 to the pressure chamber 19 and from this chamber through the straight air pipe 13 to the brake cylinder 12 thus effecting an application of the brakes.

Under certain conditions the supply of fluid under pressure past the main supply valve 88 to the chamber 19 may be at such a rapid rate as to momentarily produce a pressure in the chamber 19 which exceeds the actuating or control pressure in the piston chamber 22. It would be undesirable to permit this high pressure to act on the rear face of the control piston 15 for the reason that it would cause the piston to move towards its lap or brake releasing position and thereby permit the supply valve 88 to seat and to remain seated until such time as the pressure in the pressure chamber 19 is reduced by flow to the brake cylinder finally below the actuating pressure in the chamber 22, at which time the piston 15 would be caused to again move to unseat the supply valve. In order to prevent this undesirable alternate unseating and seating of the supply valve 88 and to insure a continuous increase in the pressure in the pressure chamber 19, and consequently in the brake cylinder 12, a rapid flow of fluid from said pressure chamber 19 to the chamber 21 at the rear of the piston 15 is prevented by the restricted flow of fluid past the baffle piston 16 through the restricted passageway 20. By thus restricting the flow of fluid under pressure to the chamber 21, the rate of increase in the pressure in this chamber is slightly slower than that of the rate of increase in pressure in the piston chamber 22 so that as long as fluid under pressure is being supplied to the piston chamber 22 the piston 15 will not be permitted to move outwardly to permit the supply valve 88 to seat.

If the brake valve device 6 is placed in application position and permitted to remain there until such time as fluid pressure in the self-lapping chamber 21 equalizes the pressure in the piston chamber 22, a full application of the brakes will be effected. If however the brake valve device 6 is moved from application position to lap position before such equalization takes place, an application of the brakes that is less than full application will result, depending upon the degree of pressure in the piston chamber 22.

When the pressure in the self-lapping chamber 21 of the relay valve device becomes substantially equal to the pressure of fluid in the piston chamber 22 the spring 104 and fluid under pressure in the chamber 97 act to seat the main supply valve 88 of the valve piston 87 after which the spring 105 acts to seat the pilot supply valve 100. The supply valves, as they are thus moved to their seat shift the plunger 109 and thereby the arm 47 of the lever 36 in the same direction. Since the arm 46 of the lever is fulcrumed on the plunger 48 this movement of the arm 47 causes the piston assembly to move forward, this is, toward the position illustrated in Fig. 1.

The seating of the supply valves 88 and 100 closes the supply of fluid under pressure to the pressure chamber 19 so that the piston assembly comes to a stop before the arm 47 of the lever 36 engages the fulcrum 114 and the lever 46 still maintains the release valves 48 and 50 seated.

When the relay valve device 8 is in lap position the switch contact member 121 is out of engagement with both of the switch contact members 131 and 132 so that the magnet windings of both the application magnet valve device 9 and the release magnet valve device 11 are deenergized and the application valve 143 and the release valve 154 are seated. Upon the movement of the actuating piston 15 of the relay valve device in either direction from lap position the switch contact member 121 will be brought into engagement, either with the switch contact member 131 controlling the release magnet valve device 11 to effect the release of fluid under pressure from the brake cylinders 12, or into engagement with the switch contact member 132 controlling the application magnet valve device 9 to effect the supply of fluid under pressure to the brake cylinder 12, just prior to the operation of the pneumatic portion of the relay valve device 8 to effect a corresponding release of fluid under pressure from the brake cylinder 12, or the supply of fluid under pressure thereto through the pressure chamber 19 of the relay valve device 8.

As above explained, if the magnet valve devices operate as intended to effect an application of the brakes, the change in pressure in the pressure chamber 19 and in the chamber 21 takes place with sufficient promptness that the pneumatic portion of the relay valve device is not required to operate and does not operate to apply the brakes therethrough. In the case of the release of the brakes the pneumatic portion ultimately moves to release position as illustrated in Fig. 1 upon the reduction in pressure in the pressure chamber 22 to atmospheric pressure.

If the electric circuits are interrupted in such manner that the magnet valve devices cannot operate to control the release of the brakes they will be released through operation of the pneumatic portion of the relay valve device 8. Assuming that the several parts of the relay valve device are in lap position when fluid under pressure is vented from the piston chamber 22 through the brake valve device 6 to the atmosphere to effect a release of the brakes, fluid under pressure in the self-lapping chamber 21 acting on the rear face of the piston 15 causes this piston, together with the baffle piston 16, the piston stem 18, the bolt 37 and the central portion of the lever 36 to move outwardly to the position in which this piston assembly is shown in Fig. 1.

Immediately after the piston assembly starts to move from pneumatic lap position toward release position the end of the arm 47 of the lever 36 fulcrums on the fulcrum member 114 and thereafter the continued movement of the piston stem 26 outwardly causes the arm 46 of the lever and thereby the plunger 48 to move in the direction of the piston 15 the plunger compressing the spring 54. The plunger in its movement first moves the pilot release valve 49 from its seat against the opposing seating pressure of the fluid in the chamber 19, and then, through the medium of the valve stem 81 and stop nut 82, moves the main release valve 50 out of engagement with its seat.

It will here be noted that when this pilot release valve 49 is unseated, fluid under pressure flows from the pressure chamber 19 to the piston chamber 69 by way of the bore 76 in the piston stem and the spaces 85 between the collar 84 and the rear face of the piston 67 to the piston chamber 69. The volume of the chamber 69 is smaller and the flow of fluid thereto is at a fairly rapid rate so that the pressure of fluid in the chamber 19 quickly equalizes into the chamber 69, the flow area of the passage 68 in the piston being so small that the flow of fluid therethrough from the chamber to the atmosphere will not materially interfere with such equalization.

Fluid under pressure admitted to the chamber 69 acts through the medium of the piston 67 to substantially unload the main release valve 50 so that substantially only the frictional resistance of the piston 67 and the force of the spring 54 need be overcome by the piston assembly to unseat the valve.

With the main release valve 50 unseated, fluid under pressure flows from the brake cylinders 12 through the straight air pipe 17, the pressure chamber 19, past the unseated valve 50, and to the exhaust port 71, thus releasing the brakes.

The pneumatic portion of the relay valve device illustrated in Fig. 2 may be identical with that illustrated in Fig. 1, the switch mechanism being somewhat different. The switch construction in Fig. 2 comprises a spring biased contact member 161 connected by the conductor 132 to the positive terminal of the battery 134, and normally biased by the bolt 160 into engagement with a contact member 162 that is connected to the release magnet valve wire 136, and that is adapted to be forced out of engagement with the contact member 162 and into engagement with a contact member 163 that is connected to the application magnet valve wire 136.

Figure 3:
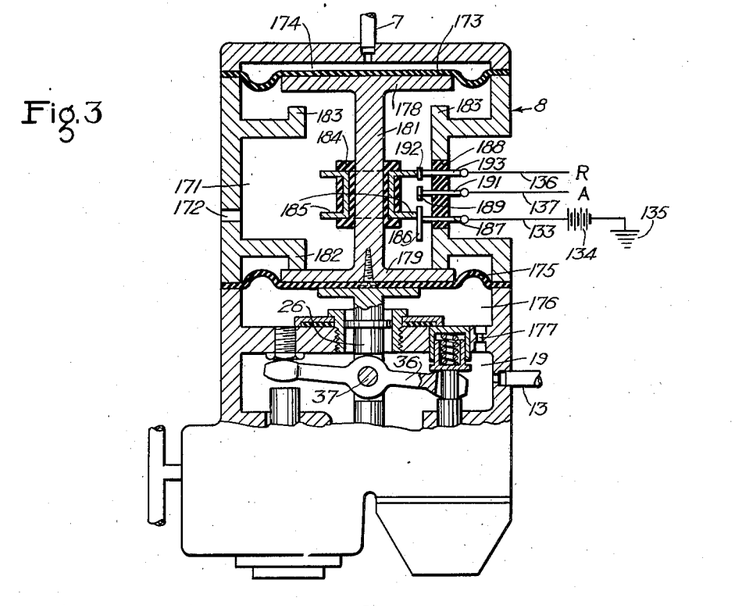

In the form of the relay valve device 8 illustrated in Fig. 3 the switch contact members are in a chamber 171 that is maintained at atmospheric pressure through an opening 172, and that is bounded at one side by a movable diaphragm 173 separating the chamber 171 from an operating chamber 173, that is connected by means of the control pipe 7 to be supplied with fluid under pressure in accordance with the movement of the brake valve device. The opposite side of the chamber 171 is bounded by a diaphragm 175 separating it from the self-lapping chamber 176 that is in communication with the pressure chamber 19 through a restricted passage 177 so that changes in pressure within the self-lapping chamber 176 take place gradually within the chamber 19 as determined by the restricted passage 177. A follower plate 178 is positioned adjacent the movable diaphragm 173 and a follower plate 179 is positioned adjacent the movable diaphragm 175, these two follower plates being connected by a stem 181 to effect similar movement of the two diaphragms 173 and 175. The movement of this diaphragm assembly in one direction is limited by stops 182 that are adapted to engage the follower plate 179, and in the other direction by stops 183 that are adapted to engage the follower plate 178. An insulating member 184 is carried by the stem 181 and is provided with a switch contact member 185 that is movable with the stem 181. A fixed switch contact member 186, mounted on a stop 187 in an insulating plate 188 in the wall of the relay structure 8, is connected by the wire 133 to the positive terminal of the battery 134. A fixed switch contact member 189 that is mounted on a stop 191 in the insulating plate 188, is connected to the application magnet valve wire 137, and a switch contact member 192 that is mounted on a stop 193 is connected to the release magnet valve wire 136. The switch member 185 is adapted to bridge the contact members 186 and 192 when the diaphragm assembly is in the illustrated position to effect the energization of the release magnet valve devices, and is adapted when the stem 181 is moved forwardly to bridge the switch contact members 189 and 186, to effect the energization of the application magnet valve devices through the wire 137. In the forward movement of the diaphragms 173 and 175 from the illustrated position to the position in which the application magnet valve wire 137 is connected to the positive terminal of the battery 134, the switch contact member 185 passes through a position in which it engages neither of the contact members 192 or 189, in which position the magnets of the release magnet valve devices and also of the application magnet valve devices are all deenergized thus effecting lap position of the magnet valve devices.

The operation of the relay valve device illustrated in Fig. 3 is similar to that illustrated and fully described in respect to Fig. 1. The contact members of the electrical switch device may be so arranged that, upon movement of the stem 181 from lap position in either direction, the magnet valve device will be energized prior to the operation of the corresponding pneumatic valve portion of the relay controlled by the lever 36, so that the application and release of the brakes respectively are controlled primarily by the application magnet valve devices 9 and the release magnet valve devices 11.

Figure 4:
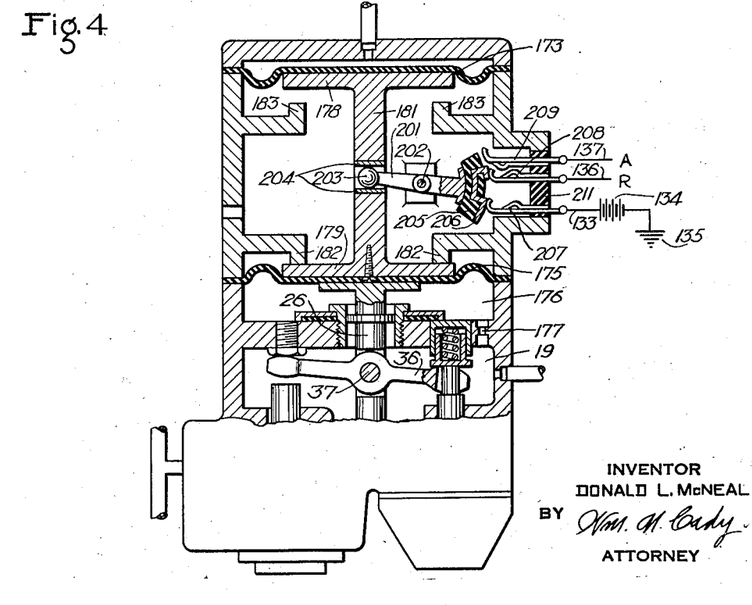

The form of the relay device shown in Fig. 4 is substantially similar to that illustrated in Fig. 3 with the exception of the specific switch mechanism, in which a switch arm 201 is provided mounted on a pivot pin 202 in the casing of the relay device structure, and provided at one end with an operating knob 203 positioned in a recess in the stem 181 having bearing plates 204, the switch arm being provided at the other end with an insulating block 205 carrying a movable contact member 206. Stationary contact members 207, 208, and 209 are mounted in a plate of insulating material 211 and connected respectively to the battery conductor 133, the release magnet valve wire 136, and the application magnet valve wire 137. The contact member 206 is movable into and out of engagement with the contact members 208 and 209 to effect the energization of the release magnet valve devices and of the application magnet valve devices, respectively, in accordance with the forward and backward movement of the stem 181 operatively connecting the follower plates 178 and 179 associated, respectively, with the diaphragms 173 and 175 in a manner to effect an operation of the application magnet valve devices similar to that described with respect to the structure illustrated in Fig. 1.

While certain embodiments of the invention have been illustrated and described it is apparent to one skilled in the art that many changes in the details of apparatus and circuits may be made within the spirit of my invention, and I do not wish to be limited otherwise than by the scope of the appended claims.

Having now described my invention, what I claim as new and desire to secure by Letters Patent, is:

1. In a brake equipment for vehicles, a brake cylinder, means for controlling the application and release of the brakes comprising a brake valve device, a relay device responsive to the operation of said brake valve device and having an electrical portion and a pneumatic portion actuated by a common movable element, electrical means responsive to the operation of said relay device for controlling the supply of fluid under pressure to, and the release of fluid under pressure from, said brake cylinder, and valve means also responsive to the operation of said relay device for controlling the supply of fluid under pressure to and the release of fluid under pressure from said brake cylinder for controlling the application and release of the brakes upon failure of the operation of the electrical means.

2. In a brake equipment for vehicles, a brake cylinder, means for controlling the application and release of the brakes comprising a brake valve device, a relay device having a control member responsive to the operation of said brake valve device, electrically operated means for controlling the supply of fluid under pressure to, and the release of fluid under pressure from, said brake cylinder, contact members operated by said relay controlling means for controlling the operation of said electrically operated means, and additional valve means controlled by said control member to correspondingly control the supply of fluid under pressure to, and the release of fluid under pressure from, said brake cylinder independently of the operation of said electrically controlled valve means.

3. In a brake equipment for vehicles, a brake cylinder, means for controlling the application and release of the brakes comprising a brake valve device, a relay device having a control member responsive to the operation of said brake valve device, electrically operated means controlled by said control member for controlling the supply of fluid under pressure to, and the release of fluid under pressure from, said brake cylinder, and additional valve means controlled by said control member to correspondingly control the supply of fluid under pressure to, and the release of fluid under pressure from, said brake cylinder independently of the operation of said electrically controlled valve means.

4. In a brake equipment for vehicles, a brake cylinder, means for controlling the application and release of the brakes comprising a brake valve device, a relay device having a control member responsive to the operation of the said brake valve device, electrically operated valve means for controlling the supply of fluid under pressure to, and the release of fluid under pressure from, said brake cylinder, and contact members operated by said relay control member for controlling the operation of said electrically operated valve means, and additional valve means controlled by said control member to correspondingly effect the supply of fluid under pressure to, and the release of fluid under pressure from, said brake cylinder independently of the operation of said electrically controlled valve means, said contact members being arranged to effect the operation of said electrically controlled valve means prior to the operation of said additional valve means upon the movement of said control member from lap position in either direction.

5. In a vehicle brake apparatus, the combination with a brake cylinder, a supply reservoir and a main reservoir pipe for charging said reservoir, of magnet valve devices for controlling the supply of fluid under pressure from said supply reservoir to said brake cylinder, a relay device for controlling said magnet valve devices and for also controlling the supply of fluid under pressure to and the release of fluid under pressure from said brake cylinder independently of said magnet valve devices, and a brake valve device for controlling the supply of fluid under pressure to said relay device.

6. In a train brake system, the combination with a straight air brake equipment, of means for effecting an application of the brakes by straight air pipe operation and including a manually movable control device and a relay device controlled thereby, said relay device having a control chamber responsive to fluid under pressure supplied by said manually movable control device, and control means operative in accordance with the pressure in said control chamber for controlling the application of the brakes, means responsive to the operation of said relay control means for controlling the application of said brakes electrically, and means responsive to the operation of said relay control means for pneumatically controlling the application of said brakes independently of said electrically controlled means.

7. In a brake system for vehicles, in combination, a brake cylinder, a straight air pipe for supplying fluid under pressure to said brake cylinder, magnet valve devices for controlling the supply of fluid under pressure to and the release of fluid under pressure from said straight air pipe to control the application and release of the brakes, a control pipe, a relay device for controlling the operation of said magnet valve devices and having a control chamber subject to control pipe pressure and a self-lapping chamber subject to straight air pipe pressure and a control element subject to the differential pressures in said two chambers, switch contact members actuated by said control element for controlling the operation of said magnet valve devices and valve means also controlled by said control element for controlling the supply of fluid under pressure to and the release of fluid under pressure from said straight air pipe independently of the operation of said magnet valve devices.

8. In a fluid pressure brake, in combination, a brake cylinder, a relay valve device having a movable abutment operated by fluid pressure for supplying fluid under pressure to the brake cylinder, magnet valve devices also operative for supplying fluid under pressure to the brake cylinder, and switch control members operated by said abutment for controlling the operation of said magnet valve devices to effect a parallel supply of fluid under pressure to the brake cylinder through said magnet valve devices and through said relay valve device.

9. In a fluid pressure brake, in combination, a brake cylinder, a relay device having a control member operated by fluid pressure for supplying fluid under pressure to the brake cylinder, magnet valve devices also operated for supplying fluid under pressure to the brake cylinders, and switch members actuated by said control member for controlling the operation of said magnet valve devices to effect a parallel supply of fluid under pressure to the brake cylinders through said magnet valve devices and through said relay valve device.

10. In a fluid pressure brake, in combination, a brake cylinder, a relay device having a control member operated by fluid pressure for supplying fluid under pressure to the brake cylinder, magnet valve devices also operative for supplying fluid under pressure to the brake cylinder, and switch contact members actuated by said control member for controlling the operation of said magnet valve devices to effect a parallel supply of fluid under pressure to the brake cylinder through said magnet valve devices and through said relay valve device, the parts of said relay valve device being so arranged that the movement of said control member from release position to application position effects pneumatic release, electric release, electric application, and pneumatic application in the order recited.

11. In a fluid pressure brake, in combination, a brake cylinder, a relay device having a control element operated by fluid pressure corresponding to the desired degree of application of the brakes, a release valve and an application valve mechanically controlled by said control element for controlling the supply of fluid under pressure to and the release of fluid under pressure from said brake cylinder, switch contact members controlled by said control element, a release magnet valve device and an application magnet valve device controlled by said switch contact members for controlling the supply of fluid under pressure to and the release of fluid under pressure from said brake cylinder in parallel with the control of said fluid pressure and controlled by said first named release valve and application valve.

12. In a fluid pressure brake, in combination, a brake cylinder, a relay device having a control element operated by fluid pressure corresponding to the desired degree of application of the brakes, a release valve and an application valve mechanically controlled by said control element for controlling the supply of fluid under pressure to and the release of fluid under pressure from said brake cylinder, switch contact members controlled by said control element, a release magnet valve device and an application magnet valve device controlled by said switch contact members for controlling the supply of fluid under pressure to and the release of fluid under pressure from said brake cylinder in parallel with the control of said fluid pressure as controlled by said first named release valve and application valve, said switch contact members being so arranged that in movement from lap position to application position the electrically controlled application valve operates in advance of the mechanically controlled application valve and in movement from lap to release position the electrically controlled release operates in advance of the mechanically controlled release valve.

13. In a brake equipment for vehicles, in combination, a brake cylinder, valve means for controlling the supply and release of fluid under pressure to and from the brake cylinder, a movable abutment operated by variations in fluid pressure for operating said valve means, a stem extending from one side of said abutment and operatively connected to said valve means, electrically controlled means for also controlling the supply and release of fluid under pressure to and from the brake cylinder, a second stem extending from the opposite side of said abutment, and contact members operable by said second stem for controlling the operation of said electrically controlled means.

14. In a fluid pressure brake, in combination, a brake cylinder, magnet valve devices for controlling the supply of fluid under pressure to and the release of fluid under pressure from said brake cylinder, a control device having a pair of spaced movable abutments connected by a common stem to effect similar movements thereof, switch controlled members operated by said stem for controlling the operation of said magnet valve devices, means for controlling the supply of fluid under pressure to one side of one of said abutments at a pressure corresponding with the desired degree of application of the brakes, and means for supplying fluid under pressure to one side of the other abutment in accordance with brake cylinder pressure, said stem and abutments being responsive to the differential pressures on said two abutments.

15. In a brake system for vehicles, in combination, a brake cylinder, a straight air pipe for supplying fluid under pressure to said brake cylinder, magnet valve devices for controlling the supply of fluid under pressure to and the release of fluid under pressure from said straight air pipe to control the application and release of the brakes, a control pipe, a relay device for controlling the operation of said magnet valve devices and having a control chamber subject to control pipe pressure and a self-lapping chamber subject to straight air pipe pressure and a control element subject to the differential pressures in said two chambers, and switch contact members actuated by said control element for controlling the operation of said magnet valve devices.

16. In a brake system for vehicles, in combination, a brake cylinder, a straight air pipe for supplying fluid under pressure to said brake cylinder, magnet valve devices for controlling the supply of fluid under pressure to and the release of fluid under pressure from said straight air pipe to control the application and release of the brakes, a control pipe, a relay device for controlling the operation of said magnet valve devices and having a casing and two movable abutments therein dividing said casing into three chambers, a middle chamber, a control chamber at one end of the casing subject to control pipe pressure, a self-lapping chamber at the other end of the casing subject to straight air pipe pressure, said movable abutment being connected by a stem to effect similar movements thereof and being subject to the differential pressure in said control chamber and said self-lapping chamber, and switch control members in the middle chamber actuated by said stem in accordance with the movement of said abutment for controlling the operation of said magnet valve devices.

17. In a fluid pressure brake, in combination, a brake cylinder, magnet valve devices for controlling the supply of fluid under pressure to and the release of fluid under pressure from said brake cylinder, a control device having a casing and two movable abutments therein dividing said casing into three chambers, a middle chamber open to the atmosphere, a control chamber on one side of the middle chamber subject to pressure for determining the degree of application of the brakes, a chamber on the other side of the middle chamber subject to brake cylinder pressure, said movable abutments being connected by a stem to effect similar movements thereof and being subject to the differential pressures in said two pressure chambers, and switch control means in the middle member actuated by said stem in accordance with the movements of said abutment for controlling the operation of said magnet valve devices.

18. In a fluid pressure brake equipment, in combination, means for operating the brakes, a control device therefor having a pair of spaced movable abutments connected by a common stem to effect corresponding movements thereof, switch control members operated by said stem for controlling the operation of said brake operating means, means for controlling the supply of fluid under pressure to one side of one of said abutments at a pressure corresponding to the desired degree of application of the brakes, and means for supplying fluid under pressure to one side of the other abutment in accordance with the actual degree of application of the brakes, said stem and abutments being responsive to the differential pressures on said two abutments.

19. In a fluid pressure brake equipment, in combination, brake operating means, a control device therefore having a casing and two movable abutments therein dividing said casing into three chambers, a middle chamber, a control chamber at one end of the casing subject to a pressure that varies in accordance with the desired degree of application of the brakes, a self-lapping chamber at the other end of the casing subject to pressure that corresponds to the actual degree of application of the brakes, said movable abutments being connected by a stem to effect corresponding movements thereof and being subject to the differential pressures in said control chamber and said self-lapping chamber, and switch control members in the middle chamber actuated by said stem in accordance with the movement of said abutments for controlling the operation of said brake operating means.

20. In a fluid pressure brake system, in combination, a first movable abutment subject to fluid under pressure supplied to a first chamber to a degree according to a desired degree of application of the brakes, a second movable abutment subject to fluid under pressure supplied to a second chamber according to the actual degree of application of the brakes, means interconnecting said two abutments and shifted according to the differential of pressure between said two chambers, and switch means operated by said interconnecting means for controlling the degree of application of the brakes.

21. In a fluid pressure brake system, in combination, a first movable abutment subject to fluid under pressure supplied to a first chamber to a degree according to a desired degree of application of the brakes, a second movable abutment subject to fluid under pressure supplied to a second chamber according to the actual degree of application of the brakes, means located between said abutments and shifted by said abutments according to the differential force of pressures acting on said abutments in said two chambers, and switch means operated by said last means for controlling the degree of application of the brakes.

22. In a fluid pressure brake system, in combination, a first movable abutment subject to fluid under pressure supplied to a first chamber to a degree according to a desired degree of application of the brakes, a second movable abutment subject to fluid under pressure supplied to a second chamber according to the actual degree of application of the brakes, means located between said abutments and shifted by said abutments according to the differential force of pressures acting on said abutments in said two chambers, circuit-controlling means conditioned according to the position assumed by said last means, and means controlled by the circuit-controlling means for controlling the degree of application of the brakes.

DONALD L. McNEAL.

CERTIFICATE OF CORRECTION.

Patent No. 2,068,345.　　　　　　　　　　　　　　　　　　　　January 19, 1937.

DONALD L. McNEAL.

It is hereby certified that error appears in the printed specification of the above numbered patent requiring correction as follows: Page 9, first column, line 39, claim 17, for the word "member" read chamber; and that the said Letters Patent should be read with this correction therein that the same may conform to the record of the case in the Patent Office.

Signed and sealed this 6th day of April, A. D. 1937.

(Seal)　　　　　　　　　　　　　　　　　　　　　　　　　　Henry Van Arsdale
　　　　　　　　　　　　　　　　　　　　　　　　　Acting Commissioner of Patents.